United States Patent Office 3,007,628
Patented Nov. 7, 1961

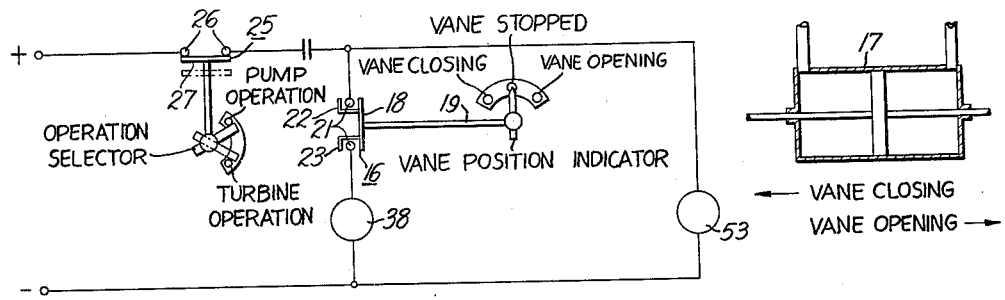
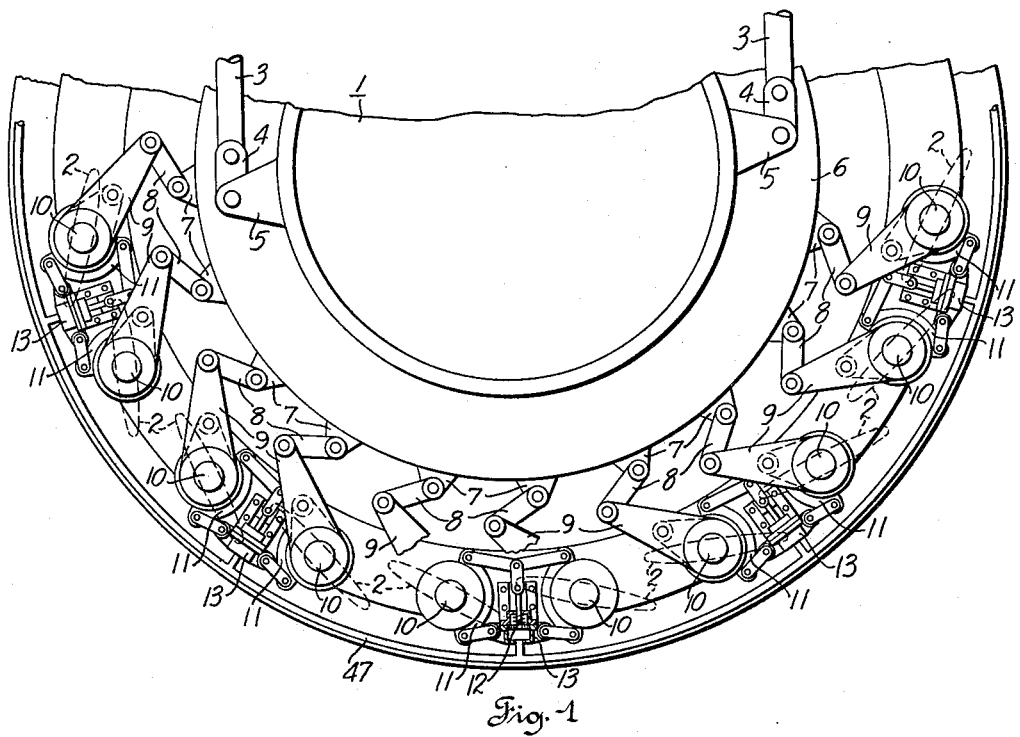

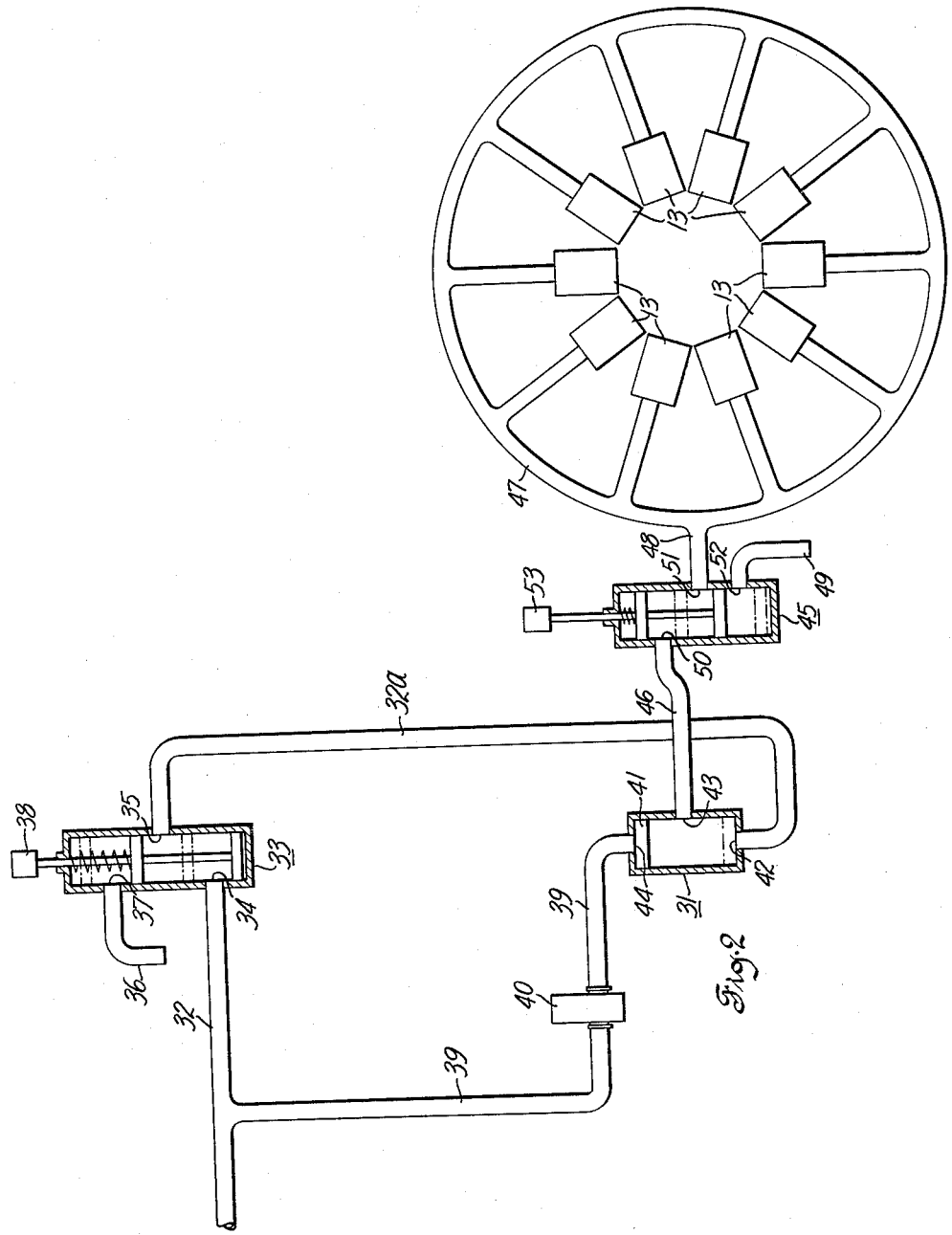

3,007,628
CONTROL SYSTEM FOR HYDRAULIC MACHINE GUIDE VANE DAMPING BRAKES
Beverly R. Nichols, Elm Grove, Wis., assignor to Allis-Chalmers Manufacturing Company, Milwaukee, Wis.
Filed Apr. 3, 1958, Ser. No. 726,228
6 Claims. (Cl. 230—114)

The present invention relates generally to improvements in a hydraulic pump turbine and specifically to a hydraulic pump turbine having improved means for controlling vane damping brakes.

Heretofore in hydraulic pumps or turbines, damping brakes operated by a fluid pressure servomotor have been used to grip turbine or pump guide vanes to prevent their fluttering. The control system in damping brakes according to prior art practices is designed to place the brakes firmly in contact with the guide vanes at all times except when they were being adjusted. When the vanes are being adjusted the brakes are retracted from a vane engaging position.

With the advent of the reversible pump turbine the typically large hydraulic turbine when reversed becomes an unusually large pump. Thus in these large reversible units the flutter of the guide vanes when the unit is being used as a pump causes more serious vibration problems than had to be faced before the advent of the reversible unit. It is desirable in these units to have positive control of the guide vanes at all times when the unit is being used as a pump and even while the vanes are being adjusted. Of course, when the vanes are being adjusted, it is desirable to have the damping brakes operate only as a drag or frictional force. It is also desirable in the pump turbine unit to have a control for the damping brakes that will automatically apply the brakes when the unit is switched from operation as a turbine to operation as pump and correspondingly will release the brakes when the unit is switched from operation as a pump to operation as a turbine.

In the present invention it is proposed to provide means which will automatically apply the damping brakes when the unit is switched from operation as a turbine to operation as a pump and which will automatically release the brakes when the unit is switched from operation as a pump to operation as a turbine. In addition the present invention proposes to provide in the control system automatic means which will only partially release the brakes during adjustment of the guide vanes so that the brakes act only as a drag or frictional force.

In a preferred embodiment of the present invention a damping brake control means is connected to a high pressure air line. A system of two three way solenoid valves and one three way pressure operated valve is arranged in the line and connected to turbine controls in a manner which permits the system to be deenergized and therefore completely inoperative during the operation of the unit as a turbine. When the unit is switched from operation as a turbine to operation as a pump, a solenoid circuit is energized permitting compressed air to be admitted to the system and to apply the brakes. When during operation as a pump, the guide vanes are to be moved to adjust their position, one of the three way solenoid valves is deenergized shutting off the supply of high pressure air but the system remains open allowing air at reduced pressure from a bleeder line to be admitted to the system at a preset minimum pressure to thereby provide sufficient power to operate the brakes as drag or frictional force.

It is, therefore, an object of this invention to provide in a reversible pump turbine, an improved control system for vane brakes permitting the damping brakes to be applied at all times when the unit is being operated as a pump.

Another object of this invention is to provide in a reversible pump turbine, a control system for vane brakes which permits the brakes to be automatically applied when the unit is switched from operation as a turbine to operation as a pump.

Another object of the invention is to provide in a reversible pump turbine, a control system for vane brakes which permits the damping brakes to be automatically released when the unit is switched from operation as a pump to operation as a turbine.

It is another object of this invention to provide in a reversible pump turbine, a control system for vane brakes constructed and arranged to apply the damping brakes as a frictional or drag force while the guide vanes are being adjusted.

Other objects will appear hereinafter as a description of the invention proceeds. The novel features of the invention and how the objects are attained will appear more fully from this specification and the accompanying drawings showing an embodiment of the invention and forming a part of this application and all of these novel features are intended to be pointed out in the appended claims.

FIG. 1 is a plan view of a portion of a hydraulic machine showing damping devices, their relationship to guide vanes, and mechanism which moves the damping devices into engagemtnt with the guide vanes;

FIG. 2 is a schematic view of a fluid pressure system and circular header for operating damping devices for vanes of a hydraulic machine; and FIG. 3 is a diagrammatic view of the electrical control circuit for the control means.

Referring now to the drawings, wherein like reference characters designate like or corresponding parts throughout the several views, there is shown in FIG. 1 a machine of the type operable as a fluid driven motor and as a fluid pump 1 having adjustable guide vanes 2 and means for adjusting the position of the guide vanes including connecting rods 3, links 4 connected to connecting rods 3 and flanges 5 connected to links 4 and projecting from each side of the gate operating ring 6. Each connecting rod 3 is operated by a conventional servomotor (not shown). Gate operating ring 6 carries a plurality of flanges 7 which pivotally carry a plurality of gate links 8. Each gate link 8 is in turn pivotally connected to one end of a lever 9. The other end of each lever 9 receives rotatable spindles 10 for supporting guide vanes 2.

When the gate operating ring is rotated by connecting rods 3, gate operating ring 6 in turn will move gate links 8 to rotate levers 9 which in turn rotate rotatable spindles 10 to rotate guide vanes 2.

Brake shoes 11 are arcuate and have a surface complementary to the surfaces of spindles 10 that they engage. Biasing means are shown as a spring 12 in fluid pressure operated brake operating means 13 for biasing brake shoes 11 away from spindle 10. The fluid pressure operated brake operating means 13 urges brake shoes 11 into engagement with spindles 10 when fluid pressure is applied.

In FIG. 2 a fluid pressure control system is shown for providing fluid pressure for the fluid pressure operating means 13 to engage the brake shoes 11 with the spindles 10. The control system includes pressure selector valve means 31, first fluid supply means including fluid pressure conduits 32, 32a supplying fluid at a first predetermined pressure to pressure selector valve 31. A first drain valve 33 is shown in FIG. 2 as a spool valve having a first position indicated by solid lines and a second position indicated by dotted lines. In the first position the spool valve defines a passage between ports 34 and 35 of conduits 32 and 32a so that the fluid supplied at the first predetermined pressure is delivered to pressure selector valve 31. In the second position drain valve 33 shuts off conduit 32 and port 34 defines a passage between conduit 32a and port 35 and exhaust conduit 36 and port 37 so that fluid at the first predetermined pressure may be drained from pressure selector valve 31. A first solenoid 38 is shown for operating valve 33 to drain fluid pressure from selector valve 31 for reasons that will be explained later.

The electrical circuit for energizing solenoid 38 is shown in FIG. 3. When the entire circuit is energized during pump operation, as will be explained later, the solenoid 38 is energized upon closing a switch 16. The switch 16 may be connected to a vane control panel Vane Position Indicator to indicate closing and opening movement of the vanes. The switch 16 may be provided with a bridge bar 18 which may be moved by a rod 19 connected to the Vane Position Indicator. The switch may be closed in any well known manner such as by manually moving the Vane Position Indicator. Movement of the switch 16 to the left will cause the bar 18 to bridge a pair of contacts 21. Movement of the switch 16 to the right will bring pieces 22, 23, which are shown connected to bar 18, into contact with the contacts 21. Thus, movement of bar 18 either toward or away from the contacts 21 closes switch 16 and energizes solenoid 38.

Second fluid supply means shown as conduit 39 in FIG. 2 supplies fluid at a second predetermined pressure lower than said first predetermined pressure to pressure selector valve 31. Second fluid supply means 39 is shown as a bleeder line connected to the first fluid supply conduit 32 upstream of first drain valve 33 and a pressure reducing valve 40 is included in second fluid supply conduit 39 to reduce the pressure in conduit 39 below the pressure in conduit 32 before the second predetermined pressure is delivered to pressure selector valve 31. Pressure selector valve 31 is shown in FIG. 2 as having a movable piston 41. When valve 33 is positioned to admit fluid pressure from conduit 32 to conduit 32a, a piston 41 will be pushed up by the higher pressure from conduit 32a to close off conduit 39 and define a passage between a port 42 and port 43 of pressure selector valve 31 allowing fluid pressure at said first predetermined rate to be delivered to the brake operating means 13. When the valve 31 is drained of pressure fluid by drain valve 33, the fluid from conduit 39 at the second predetermined pressure, which is the lower pressure, will push piston 41 down to define a passage between a port 44 of conduit 39 and port 43 so that fluid pressure at the second predetermined pressure is delivered to the brake operating means 13.

A second drain valve 45 is shown in FIG. 2 as a three way spool valve connected to pressure selector valve 31 by conduit 46 and connected to circular header 47 by conduit 48 and having an exhaust conduit 49. Second drain valve 45 is a spool valve having a first position indicated by solid lines and a second position indicated by dotted lines. In the first position a passage is defined between ports 50 and 51 of conduits 46 and 48, respectively, so that the pressure selected by pressure selector valve 31 may be delivered to circular header 47. In the second position drain valve 45 defines a passage between ports 51 of conduit 48 and port 52 of exhaust conduit 49 to block the pressure being supplied by the pressure selector valve 31 and drain pressure from the circular header 47 and brake operating means 13. A solenoid 53 is shown for lifting second drain valve 45 to open communication from conduit 46 to conduit 48. A second switch 25 shown in FIG. 3 is provided to actuate solenoid 53. Switch 25 is connected to an Operation Selector shown in FIG. 3 as having two positions, Pump Operation and Turbine Operation. The switch 25 connects a pair of contacts 26 by a bar 27 when the Operation Selector is turned to the Pump Operation position.

Referring to FIG. 3, the servomotor control valve 17 is of any conventional type and may be a conventional spool valve having a casing 56. Slidably positioned within the casing 56 is a pressure balanced spool 57 having an annular centrally located relieved portion 58 in fluid communication with an inlet conduit 59 which is connected to any type of conventional fluid pump (not shown). The control valve 17 is provided with two reservoir conduits 60 and 61 which connect opposite ends of the servomotor control valve casing to a reservoir (not shown). The servomotor control valve 17 is also provided with two outlet conduits 62 and 63 which are connected to servomotors (not shown) which are in turn connected to the connecting rods 3 of the vane actuating mechanism. Compression springs 64 and 65 bias the spool 57 to the neutral position shown, blocking the inlet fluid from the outlet conduits 62 and 63. The spool 57 is connected to the rod 19 through a lost motion coupling. This coupling may be of any conventional design and is herein shown as having a cylindrical portion 66 rigidly connected to the rod 19. A longitudinally disposed slot 67 in the cylinder 66 receives a pin 68 formed on the end of a rod 69 which is connected to the spool 57.

In operation, when it is desired to operate the hydraulic machine as a pump, the Operation Selector is moved to the Pump Operation position and switch 25 bridges contacts 26 closing the circuit to energize solenoid 53 and open communication from conduit 46 to conduit 48. Fluid under pressure is present in conduit 32 and with the vanes in an at rest position drain valve 33 is in the first position indicated by the solid lines defining a passage between port 34 of conduit 32 and port 35 of conduit 32a so that fluid at a first predetermined pressure is delivered through port 42 to pressure selector valve 31. Pressure in conduit 39 is reduced by pressure reducing valve 40 and supplied at a reduced predetermined pressure to pressure selector valve 31 at port 44. The greater pressure supplied to pressure selector valve 31 through port 42 biases piston 41 to the upper position blocking the pressure at a reduced rate supplied through port 44 and defining a passage between port 42 and 43 so that pressure at the first predetermined rate is delivered through conduit 46 to second drain valve 45. Second solenoid operated drain valve 45 having been actuated by switch 25 shown in FIG. 3 assumes its first position indicated by solid lines defining a passage between port 50 of conduit 46 and port 51 of conduit 48 supplying pressure at the first predetermined rate to circular header 47 which distributes the pressure to brake operating means 13 shown in FIG. 1 and the brakes 11 will hold the vanes 2 tightly in position.

When it is desired to adjust the position of the guide vanes, switch 16 shown in FIG. 3 and the Vane Position Indicator is moved in a vane opening or vane closing direction, and switch 16 is closed to energize solenoid 38 to operate valve 33 to drain conduit 32a and valve 31. The lost motion connection between the rods 19 and 69 allows the switch 16 to be closed before the spool 57 is moved to an open position. When the switch 16 is closed the brakes are partially released, as explained above, permitting the vanes to be adjusted upon further movement of the vane position indicator to activate the spool valve. Drain valve 33 drains conduit 32a by moving to the second position indicated by the dotted lines blocking off fluid supply conduit 32 and defining a passage between port 35 of conduit 32a and port 37 of exhaust conduit 36 draining the fluid pressure at the first predetermined rate that is supplied to pressure selector valve 31. Pressure at the first predetermined rate having been drained from pressure selector valve 31 the pressure at the second predetermined rate entering pressure selector valve 31 through port 44 biases piston 41 to its lowest position defining a passage between port 44 and port 43 of pressure selector valve 31 and supplying pressure from conduit 39 to conduit 46. Fluid pressure at the second predetermined pressure passes through the passage 46 and drain valve 45 which remained in the position connecting conduit 46 to conduit 48 and pressure at the reduced rate is supplied to conduit 48 and circular header 47 which distributes the pressure at the second predetermined rate to brake operating means 13. The brakes 11 activated by a second predetermined pressure act as a drag or frictional force on spindles 10 as the vanes are adjusted after the spool 57 has been moved to either vane adjusting position. After the vanes have been adjusted to the desired position, the vane position indicator is moved back to the vane stopped position. The spool valve 57 biased by the springs 64 and 65 follows the movement of the vane position indicator until the spool has assumed its neutral closed position. This position is reached when the vane indicator lever has been moved to the switch closed position and further movement of the vane indicator to the vane stopped position centers the pin 68 in the slot 67 neutralizing the linkage for future adjustment of the vanes.

When it is desired to operate the machine as a turbine, switch 25 shown in FIG. 3 is moved to break contact between the points 26 thereby deactivating the electrical circuit and solenoid valves 33 and 45. When solenoid 53 is deenergized, second drain valve 45 moves to its lowest position shown in FIG. 2 in dotted lines blocking off fluid pressure being supplied through conduit 46 and port 50 and defining a passage between port 51 and port 52 of drain valve 45 draining pressure from circular header 47 and conduit 48 and brake operating means 13. The brakes are thus disengaged from spindle 10 shown in FIG. 1.

These and other features and advantages will be obvious to those skilled in this art. It will also be obvious to those skilled in this art that the illustrated embodiment of the invention provides a new and improved control and means for damping brakes on a hydraulic machine and accordingly accomplishes the objects of the invention. On the other hand it will also be obvious to those skilled in the art that the illustrated embodiment of the invention may be variously changed and modified or features thereof singly or collectively embodied in other arrangements than that illustrated without departing from the spirit of the invention or sacrificing all of the advantages thereof, and that accordingly the disclosure herein is illustrative only and the invention is not limited thereto.

What is claimed is:

1. In a machine of the type operable as a fluid driven motor and as a fluid pump having adjustable guide vanes, means connected to said guide vanes to adjust the positions of the guide vanes including rotatable spindles to support said guide vanes, brake shoes engageable with said spindles, biasing means connected to said brake shoes to urge said brake shoes away from said spindles, fluid pressure operated brake operating means connected to said brake shoes to overcome said biasing means and urge said brake shoes into engagement with said spindles, and a control system connected to said brake operating means to provide fluid pressure to said fluid pressure operated brake operating means, said control system comprising: pressure selector valve means, first fluid supply means connected to said pressure selector value means to supply fluid at a first predetermined pressure to said selector valve means, second fluid supply means connected to said pressure selector valve means to supply fluid to said selector valve means at a second predetermined pressure below said first predetermined pressure, fluid conduit means connecting said selector valve means and said selector valve to said brake operating means, and said selector valve means being operable to connect said first fluid supply means to said conduit means to deliver said first predetermined pressure to said conduit means, and said selector valve means being additionally operable to connect said second fluid supply means to said conduit means to deliver said second predetermined pressure to said conduit means.

2. In a machine of the type operable as a fluid driven motor and as a fluid pump having adjustable guide vanes, means connected to said guide vanes to adjust the positions of the guide vanes including rotatable spindles to support said guide vanes, brake shoes engageable with said spindles, biasing means connected to said brake shoes to urge said brake shoes away from said spindles, fluid pressure operated brake operating means connected to said brake shoes to overcome said biasing means and urge said brake shoes into engagement with said spindles, and a control system connected to said brake operating means to provide fluid pressure to said fluid pressure operated brake operating means, said control system comprising: pressure selector valve means, first fluid supply means connected to said pressure selector valve means to supply fluid at a first predetermined pressure to said selector valve means, means connected to said pressure selector valve means to drain said first predetermined pressure fluid from said selector valve means, second fluid supply means connected to said pressure selector valve means to supply fluid to said selector valve means at means to supply fluid to said selector valve means at a second predetermined pressure below said first predetermined pressure, fluid conduit means connecting said selector valve means to said brake operating means, and said selector valve means being responsive to first predetermined pressure delivered to said selector valve means by said first fluid supply means to operate to connect said first fluid supply means to said conduit means to deliver said first predetermined pressure to said conduit means, and said selector valve means being additionally responsive to draining of fluid pressure from said selector valve means to operate to connect said second fluid supply means to said conduit means to deliver said second predetermined pressure to said conduit means.

3. In a machine of the type operable as a fluid driven motor and as a fluid pump having adjustable guide vanes, means connected to said guide vanes to adjust the positions of the guide vanes including rotatable spindles to support said guide vanes, brake shoes engageable with said spindles, biasing means connected to said brake shoes to urge said brake shoes away from said spindles, fluid pressure operated brake operating means connected to said brake shoes to overcome said biasing means and urge said brake shoes into engagement with said spindles, and a control system connected to said brake operating means to provide fluid pressure to said fluid pressure operated brake operating means, said control system comprising: pressure selector valve means, first fluid supply means connected to said pressure selector valve means to supply fluid at a first predetermined pressure to said selector valve means, means connected to said pressure selector valve means to drain said first predetermined pressure fluid from said selector valve means, second fluid supply means connected to said pressure selector valve means to supply fluid to said selector valve means at a second predetermined pressure below said first predetermined pressure, fluid conduit means connecting said selector valve means to said brake operating means, and said selector valve means including fluid flow control means responsive to first predetermined pressure delivered to said selector valve means by said first fluid supply means to operate to block said second fluid supply means and connect said first fluid supply means to said conduit means to deliver said first predetermined pressure to said conduit means, and said fluid flow control means being additionally responsive to draining of said first predetermined fluid pressure from said selector valve means to operate to connect said second fluid supply means to said conduit means to deliver said second predetermined pressure to said conduit means.

4. In a machine of the type operable as a fluid driven motor and as a fluid pump having adjustable guide vanes, means connected to said guide vanes to adjust the positions of the guide vanes including rotatable spindles to support said guide vanes, brake shoes engageable with said spindles, biasing means connected to said brake shoes to urge said brake shoes away from said spindles, fluid pressure operated brake operating means connected to said brake shoes to overcome said biasing means and urge said brake shoes into engagement with said spindles, and a control system connected to said brake operating means to provide fluid pressure to said fluid pressure operated brake operating means, said control system comprising: a fluid operated pressure selector valve, first fluid supply means connected to said fluid operated pressure selector valve to supply fluid at a first predetermined pressure to said selector valve, a first drain valve in said first fluid supply means operable to drain fluid pressure from said selector valve, a solenoid connected to said first drain valve to actuate said first drain valve, a switch connected to said vane adjusting means and to said solenoid and responsive to adjusting action of said vane adjusting means to actuate said solenoid and operate said first drain valve, second fluid supply means connected to said fluid operated pressure selector valve to supply fluid to said selector valve at a second predetermined pressure below said first predetermined pressure, fluid conduit means connecting said selector valve to said brake operating means, and a movable element within said selector valve movable in response to said first predetermined fluid pressure delivered to said selector valve by said first fluid supply means to block said second fluid supply means and define a passage connecting said first fluid supply means to said conduit means and movable in response to draining action of said first drain valve draining said first fluid pressure from said selector valve and in response to said second predetermined pressure below said first fluid pressure to define a passage connecting said second fluid supply means to said conduit.

5. In a machine of the type operable as a fluid driven motor and as a fluid pump having a control panel selector to change operation from turbine to pump, adjustable guide vanes, means connected to said guide vanes to adjust the positions of the guide vanes including rotatable spindles to support said guide vanes, brake shoes engageable with said spindles, biasing means connected to said brake shoes to urge said brake shoes away from said spindles, fluid pressure operated brake operating means connected to said brake shoes to overcome said biasing means and urge said brake shoes into engagement wtih said spindles, and a control system connected to said brake operating means to provide fluid pressure to said fluid pressure operated brake operating means, said control system comprising: a fluid operated pressure selector valve, first fluid supply means connected to said fluid operated pressure selector valve to supply fluid at a first predetermined pressure to said selector valve, a first drain valve in said first fluid supply means operable to drain fluid pressure from said selector valve, a first solenoid connected to said first drain valve to actuate said first drain valve, a first switch connected to said vane adjusting means and to said first solenoid and responsive to adjusting action of said vane adjusting means to actuate said solenoid and operate said first drain valve, second fluid supply means connected to said fluid operated pressure selector valve to supply fluid to said selector valve at a second predetermined pressure below said first predetermined pressure, fluid conduit means connecting said selector valve to said brake operating means, a second drain valve connected to said fluid conduit means to open said brake operating means to drain, a second solenoid connected to said second drain valve to actuate said second drain valve, a second switch connected to said control panel selector and said second solenoid and responsive to action changing operation from turbine to pump to actuate said second solenoid to close the drain of said second drain valve, and a movable element within said selector valve movable in response to said first predetermined pressure delivered to said selector valve by said first fluid supply means to block said second fluid supply means and define a passage connecting said first fluid supply means to said conduit means and movable in response to draining action of said first drain valve draining said first fluid pressure from said selector valve and in response to said second predetermined pressure below said first fluid pressure to define a passage connecting said second fluid supply means to said conduit.

6. In a machine of the type operable as a fluid driven motor and as a fluid pump having a control panel selector to change operation from turbine to pump, adjustable guide vanes, means connected to said guide vanes to adjust the positions of the guide vanes including rotatable spindles to support said guide vanes, brake shoes engageable with said spindles, biasing means connected to said brake shoes to urge said brake shoes away from said spindles, fluid pressure operated brake operating means connected to said brake shoes to overcome said biasing means and urge said brake shoes into engagement with said spindles, and a control system connected to said brake operating means to provide fluid pressure to said fluid pressure operated brake operating means, said control system comprising: a fluid operated pressure selector valve, first fluid supply means connected to said fluid operated pressure selector valve to supply fluid at a first predetermined pressure to said selector valve, a first drain valve in said first fluid supply means operable to drain fluid pressure from said selector valve, a first solenoid connected to said first drain valve to actuate said first drain valve, a first switch connected to said vane adjusting means and to said first solenoid and responsive to adjusting action of said vane adjusting means to actuate said solenoid and operate said first drain valve, second fluid supply means connected to said selector valve, said second fluid supply means comprising a bleeder line connected to said first fluid supply means upstream of said first drain valve and a pressure reducing valve in said bleeder line to deliver fluid pressure to said selector valve at a second predetermined pressure below said first predetermined pressure, fluid conduit means connecting said selector valve to said brake operating means, a second drain valve connected to said fluid conduit means to open said brake operating means to drain, a second solenoid connected to said second drain valve to actuate said second drain valve, a second switch connected to said control panel selector and said second solenoid and responsive to action changing operation from turbine to pump to actuate said second solenoid to close the drain of said second drain valve, and a movable element within said selector valve movable in response to said first predetermined pressure delivered to said selector valve by said first fluid supply means to block said second fluid supply means and define a passage connecting said first fluid supply means to said conduit means and movable in response to draining action of said first drain valve draining said first fluid pressure from said selector valve and in response to said second predetermined pressure below said first predetermined pressure to define a passage connecting said second fluid supply means to said conduit.

References Cited in the file of this patent

UNITED STATES PATENTS

| | | |
|---|---|---|
| 2,010,555 | Moody | Aug. 6, 1935 |
| 2,277,255 | Rudert et al. | Mar. 24, 1942 |
| 2,671,635 | Willi | Mar. 9, 1954 |
| 2,823,009 | Ambroz | Feb. 11, 1958 |

FOREIGN PATENTS

| | | |
|---|---|---|
| 676,559 | Germany | June 7, 1939 |